United States Patent
Biswas et al.

(10) Patent No.: US 12,261,848 B2
(45) Date of Patent: *Mar. 25, 2025

(54) MULTI-USER DEVICES IN A CONNECTED HOME ENVIRONMENT

(71) Applicant: Apple Inc., Cupertino, CA (US)

(72) Inventors: Anumita Biswas, Santa Clara, CA (US); Karl F. Schramm, Monte Sereno, CA (US); Benjamin S. Phipps, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,435

(22) Filed: Dec. 16, 2022

(65) Prior Publication Data

US 2023/0198992 A1 Jun. 22, 2023

Related U.S. Application Data

(63) Continuation of application No. 16/673,811, filed on Nov. 4, 2019, now Pat. No. 11,533,313.

(Continued)

(51) Int. Cl.
*H04L 9/40* (2022.01)
*G10L 15/22* (2006.01)
(Continued)

(52) U.S. Cl.
CPC ........... *H04L 63/102* (2013.01); *G10L 15/22* (2013.01); *H04L 12/2803* (2013.01);
(Continued)

(58) Field of Classification Search
CPC ......... G10L 15/02; G10L 15/06; G10L 15/22; H04L 12/2803; H04L 63/0815;
(Continued)

(56) References Cited

U.S. PATENT DOCUMENTS 10,089,983 B1 10/2018 Gella et al.
11,533,313 B2 * 12/2022 Biswas ............... H04L 12/2829
(Continued)

FOREIGN PATENT DOCUMENTS

CN 1422099 A 6/2003
CN 105190745 A 12/2015
(Continued)

OTHER PUBLICATIONS

European Office Action from European Patent Application No. 20723708.2, dated Aug. 23, 2022, 8 pages.
(Continued)

*Primary Examiner* — Jeong S Park
(74) *Attorney, Agent, or Firm* — BAKERHOSTETLER

(57) ABSTRACT

A device implementing a system for sharing a voice profile includes a processor configured to receive a request to share a first voice profile corresponding to a first user account associated with a first device, with a second device associated with a second user account, the second device being voice-enabled, the first voice profile being stored on a first data store associated with the first user account. The processor is further configured to update a second data store associated with the second user account to include a reference to the first voice profile stored on the first data store, and to send, to the second device, a notification that the second data store has been updated to include the reference to the first voice profile.

18 Claims, 9 Drawing Sheets

Related U.S. Application Data

(60) Provisional application No. 62/855,704, filed on May 31, 2019.

(51) Int. Cl.
  *H04L 12/28* (2006.01)
  *H04L 67/306* (2022.01)
  *H04L 67/60* (2022.01)

(52) U.S. Cl.
  CPC ...... *H04L 63/0815* (2013.01); *H04L 63/0861* (2013.01); *H04L 67/306* (2013.01); *H04L 67/60* (2022.05); *G10L 2015/223* (2013.01)

(58) Field of Classification Search
  CPC . H04L 63/0861; H04L 63/102; H04L 67/306; H04L 67/32
  See application file for complete search history.

(56) References Cited

U.S. PATENT DOCUMENTS

| | | | | |
|---|---|---|---|---|
| 2003/0097374 | A1* | 5/2003 | Himeno | G06F 16/951 |
| 2006/0027648 | A1* | 2/2006 | Cheah | H04L 63/08 |
| | | | | 235/381 |
| 2007/0225984 | A1* | 9/2007 | Milstein | G10L 21/02 |
| | | | | 704/E11.002 |
| 2014/0236598 | A1* | 8/2014 | Fructuoso | H04M 1/00 |
| | | | | 704/249 |
| 2015/0317977 | A1 | 11/2015 | Manjunath | |
| 2016/0093298 | A1 | 3/2016 | Naik et al. | |
| 2016/0269524 | A1* | 9/2016 | Stottlemyer | H04M 1/6091 |
| 2017/0025124 | A1 | 1/2017 | Mixter et al. | |
| 2017/0061965 | A1* | 3/2017 | Penilla | H04L 67/12 |
| 2018/0040322 | A1 | 2/2018 | Mixter et al. | |
| 2018/0357447 | A1* | 12/2018 | Chen | G06F 16/211 |
| 2020/0092678 | A1* | 3/2020 | Pagett | H04L 67/306 |

FOREIGN PATENT DOCUMENTS

| | | |
|---|---|---|
| CN | 105957522 A | 9/2016 |
| CN | 106663427 A | 5/2017 |

OTHER PUBLICATIONS

International Search Report and Written Opinion from PCT/US2020/027987, dated Jul. 17, 2020, 11 pages.
Chinese Office Action from Chinese Patent Application No. 202080038107.9, dated Feb. 24, 2023, 24 pages including English language translation.
European Intention to Grant from European Patent Application No. 20723708.2, dated Mar. 9, 2023, 8 pages.
Chinese Office Action from Chinese Patent Application No. 202080038107.9, dated Aug. 5, 2023, 20 pages including English language translation.

* cited by examiner

MULTI-USER DEVICES IN A CONNECTED HOME ENVIRONMENT

CROSS REFERENCE TO RELATED APPLICATIONS

The present application is a continuation of U.S. patent application Ser. No. 16/673,811, entitled "Multi-User Devices in a Connected Home Environment, filed Nov. 4, 2019, which claims the benefit of priority to U.S. Provisional Patent Application No. 62/855,704, entitled "Multi-User Devices in a Connected Home Environment," and filed on May 31, 2019, each of which is hereby incorporated herein by reference in its entirety for all purposes.

TECHNICAL FIELD

The present description relates generally to a multi-user device including a multi-user device in a connected home environment.

BACKGROUND

Multiple different devices in a home may be communicably coupled together to form a connected home environment. For example, a connected home environment may include a smart thermostat, smart switches, smart light bulbs, and the like.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
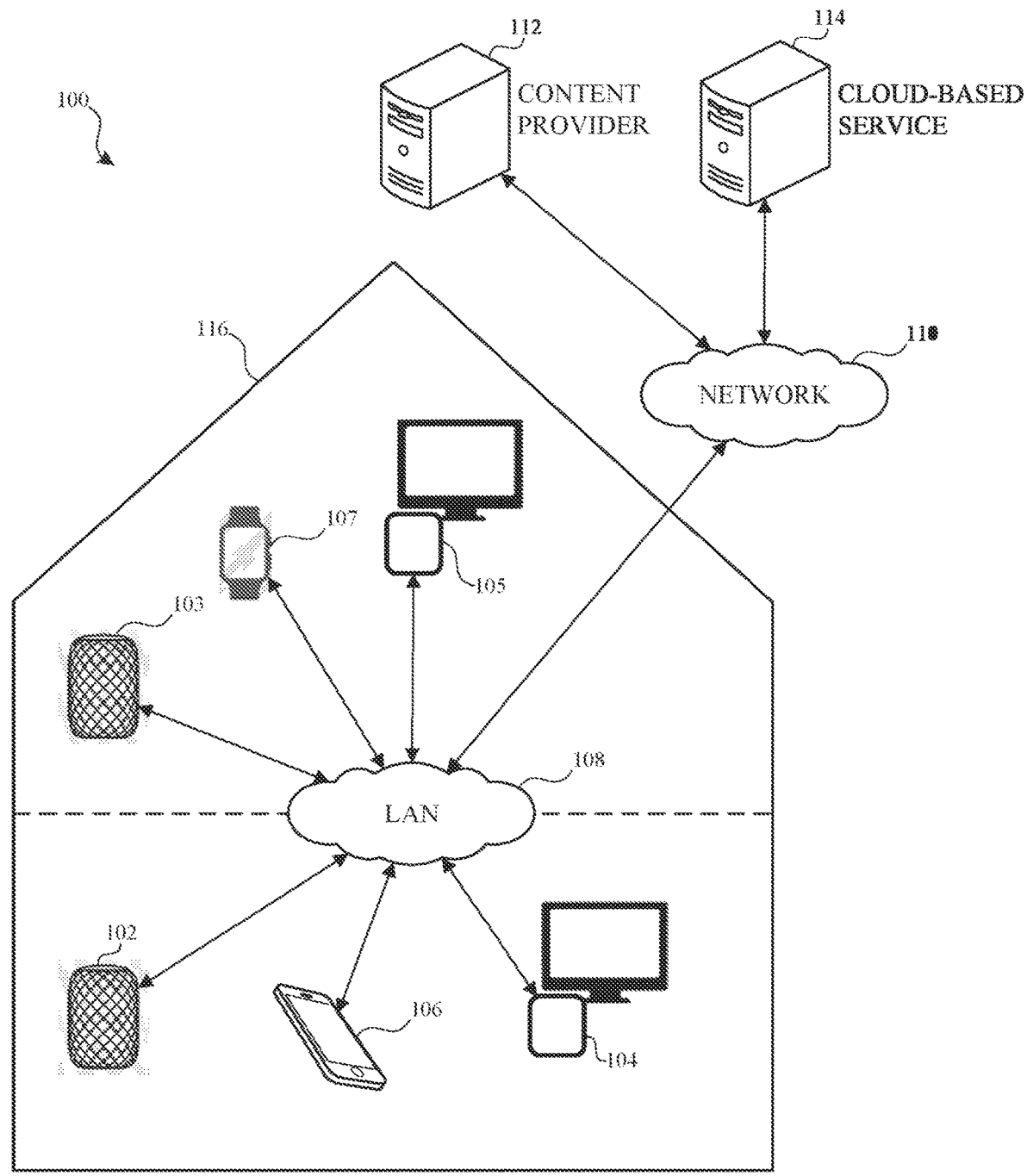
FIG. 1 illustrates an example network environment that includes a connected home environment containing multi-user devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A multi-user device in a connected home environment may facilitate outputting content in the connected home environment. For example, a multi-user device with a built-in voice assistant, such as a smart speaker with a built-in voice assistant, may receive voice requests from users to output content, such as movies, music, etc., on an output device in the connected home environment, such as on the smart speaker, on another smart speaker, on a video output device, and the like.

The subject system provides for one or more authorized users of a connected home environment (that belongs to another user) to share their voice profiles with multi-user device(s) included in the connected home environment. A user's voice profile may have been generated and stored (e.g., in a secure container associated with the user's account on a cloud storage service) by a personal electronic device of the user, such as the user's mobile phone. When a user shares their voice profile with a multi-user device in a connected home environment that belongs to another user, a secure container associated with the other user is updated to include a reference to the secure container that stores the user's voice profile. Each of the multi-user devices in the connected home environment that the user has shared their voice profile with may then access the user's voice profile through the secure container associated with the other user (which refers back to the voice profile stored on the user's secure container). Thus, the multi-user devices in the connected home environment can access the voice profiles of any authorized users of the connected home environment who have shared their voice profiles.

After a user has authorized their voice profile to be shared with multi-user devices in a connected home environment, one of the multi-user devices may receive a voice request, such as a voice request for the output of content. For example, the voice request may be to play music, play a movie, read a text message, play a game or perform another action. The multi-user device may determine which of the authorized user accounts of the connected home environment corresponds to the user who issued the voice request, if any. This determination may be made based on, for example, vocal characteristics of the voice request, and corresponding vocal characteristics indicated by the voice profiles of the authorized users of the connected home environment. Once the multi-user device determines which of the user accounts corresponds to the user who issued the voice request, the multi-user device may access one or more settings or content libraries associated with the determined user account, e.g., for responding to the voice request.

When the voice request is a request to output content in the connected home environment, the multi-user device may determine an appropriate output device in the connected home environment for outputting the content. The multi-user device may determine the appropriate output device based on one or more of: configuration settings related to positions of respective output devices within the connected home environment, user account profiles that are available on the different output devices in the connected home environment, the content available through such user account profiles, and/or device output capabilities (e.g., video/audio, audio only) of the output devices in the connected home environment.

In one or more implementations, the multi-user device may determine that the requested content is not available in a content library corresponding to the user account of the user who provided the voice request. However, the multi-user device may determine that the requested content is available in a content library corresponding to another authorized user of the connected home environment, such as the owner. Thus, the multi-user device may be configured to a select a content library corresponding to another authorized user of the connected home environment (e.g., of the owner, another user within the home and/or a default account) in order to access the requested content when the requested content is not available through the content library corresponding to the user account of the user who provided the voice request.

The subject system also provides for the multi-user device to select an appropriate request domain for responding to the voice request, where different request domains correspond to different privacy levels. For example, a personal request domain may be used for the multi-user device to access/read a text message from the personal device of the speaking user. The personal request domain may be associated with a higher privacy level than the other request domains (e.g., requiring appropriate authorization by the user based on configuration settings). A media request domain may be used to access content associated with the user's content library (e.g., which may require appropriate authorization via configuration settings for accessing a user profile). Moreover, a general request domain may be used to provide general content (e.g., weather, time and the like).

By virtue of the subject system as described herein, multiple different authorized users of a connected home environment can issue voice requests to multi-user device(s) within the connected home environment. The responses to the voice requests can be personalized for each authorized user, as appropriate, and different output devices of the connected home environment may be selected for responding to the requests, such as based on configuration settings (e.g., of the connected home environment and/or provided by the requesting user). Moreover, privacy of an authorized user of a connected home environment belonging to another user can be maintained by, for example, storing the user's voice profile and/or user preferences/settings in the user's secure container, with only a reference to the voice profile and/or preferences/settings being made available to the multi-user devices of the connected home environment belonging to the other user.

FIG. 1 illustrates an example network environment 100 that includes a connected home environment containing multi-user devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104, 105, 106 and 107 (hereinafter "the electronic devices 102-107"), a local area network ("LAN") 108, a network 110, and a content provider 112 and one or more cloud-based service(s) 114 (hereinafter "the servers 112-114"). In one or more implementations, the electronic devices 102-107 may part of a connected home environment 116, and the LAN 108 may communicatively (directly or indirectly) couple any two or more of the electronic devices 102-107 within the connected home environment 116. Moreover, the network 110 may communicatively (directly or indirectly) couple any two or more of the electronic devices 102-107 with the content provider 112 and/or the cloud-based service 114, for example, in conjunction with the LAN 108.

In one or more implementations, the LAN 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices.

In one or more implementations, the network 110 may be an interconnected network of devices that may include, and/or may be communicatively coupled to, the Internet. For explanatory purposes, the network environment 100 is illustrated in FIG. 1 as including electronic devices 102-107, and the servers 112-114; however, the network environment 100 may include any number of electronic devices and any number of servers.

One or more of the electronic devices 102-107 may be, for example, a portable computing device such as a laptop computer, a smartphone, a smart speaker, a peripheral device (e.g., a digital camera, headphones), a digital media player, a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, and/or other wireless radios.

By way of example, in FIG. 1 each of the electronic devices 102-103 is depicted as a smart speaker, the electronic device 106 is depicted as a smartphone, the electronic device 107 is depicted as a smartwatch, and each of the electronic devices 104-105 is depicted as a digital media player (e.g., configured to receive digital data such as music and/or video and stream it to a display device such as a television or other video display). In one or more implementations, one or more of the electronic devices 104-105 may be integrated into its corresponding display device. One or more of the electronic devices 102-107 may be, and/or may include all or part of, the device discussed below with respect to FIG. 2, and/or the electronic system discussed below with respect to FIG. 9.

In one or more implementations, the electronic devices 102-105 may correspond to multi-user devices, which are associated with a home account and usable to provide content and/or respond to requests (e.g., voice requests) for multiple users associated with respective user accounts of the connected home environment 116 (e.g., authorized users). One of more of the electronic devices 102-105 may be configured to receive user authorization to access respective voice profiles and/or respective user account profiles, in order to respond to a user request (e.g., a voice request) within the connected home environment 116.

In one or more implementations, the electronic device 106 may correspond to a personal device associated with a user account (e.g., of a user named "Alison"). Alison may reside in or be a guest of the home/residence (e.g., corresponding to the connected home environment 116), which is also the home of another user (e.g., named "Bob"). The electronic device 107 may be associated with a user account for Bob, and the electronic devices 102-105 may correspond to a home account for Bob. For example, the respective users may register and/or associate their respective electronic devices 102-106 to their respective user accounts through a service provider, such as through the cloud-based service 114.

In one or more implementations, Bob may interact with the electronic device 107 in order to access and/or output content (e.g., video and/or music available through Bob's content library) on one or more of the electronic devices 102-105. Moreover, based on an invitation from Bob (e.g., via the electronic device 107) and acceptance by Alison (e.g., via the electronic device 106), Alison's user account may be associated with, and accessible on, one or more of the electronic devices 102-105 (e.g., the multi-user devices) in Bob's connected home environment 116. Thus, Alison may use her electronic device 106 as a remote control in order to output content (e.g., content that is provided by the content provider 112 in association with her content library) on one or more of the electronic devices 102-105.

Alternatively or in addition, Alison may access her media content (e.g., music and/or video) on one or more of the electronic devices 102-105 without using her electronic device 106. For example, the electronic devices 102-103 (e.g., smart speakers) may have a virtual assistant application running thereon, and Alison may provide a voice request to stream music (e.g., via the content provider 112) in association with her user account (e.g., content library). In another example, the electronic devices 104-105 (e.g., digital media players) may have respective remote control devices that Alison can use (e.g., via physical button(s) and/or voice requests spoken to the remote) to output video and/or music via the content provider 112 in association with her user account.

With respect to voice requests, Alison may have selected, via a user interface provided by the electronic device 106, to authorize sharing of a voice profile associated with her user account with one or more of the electronic devices 102-105. Thus, in response to the electronic device 102 receiving a voice request by Alison for content, the electronic device 102 may determine that the request is associated with Alison's user account (e.g., based on the shared voice profile), and provide for responding to Alison's request based on her user account.

In one or more implementations, the content provider 112 may be configured to provide content (e.g., media content and/or other type(s) of content) to a device (e.g., one or more of the electronic devices 102-107). In one or more implementations, the cloud-based service 114 may be configured to perform operations in association with user accounts such as: storing data (e.g., voice profiles, user settings/preferences, files such as documents and/or photos, etc.) with respect to a user account, sharing and/or sending data with other users with respect to a user account, backing up device data with respect to a user account, and/or associating devices and/or groups of devices (e.g., within the connected home environment 116) with user accounts.

One or more of the servers 112-114 may be, and/or may include all or part of the device discussed below with respect to FIG. 2, and/or the electronic system discussed below with respect to FIG. 9. Each of the servers 112-114 may include one or more servers, such as a cloud of servers. For explanatory purposes, a single server is shown and discussed with respect to various operations for each of the servers 112-114. However, these and other operations discussed herein may be performed by one or more servers, and each different operation may be performed by the same or different servers.

Figure 2:
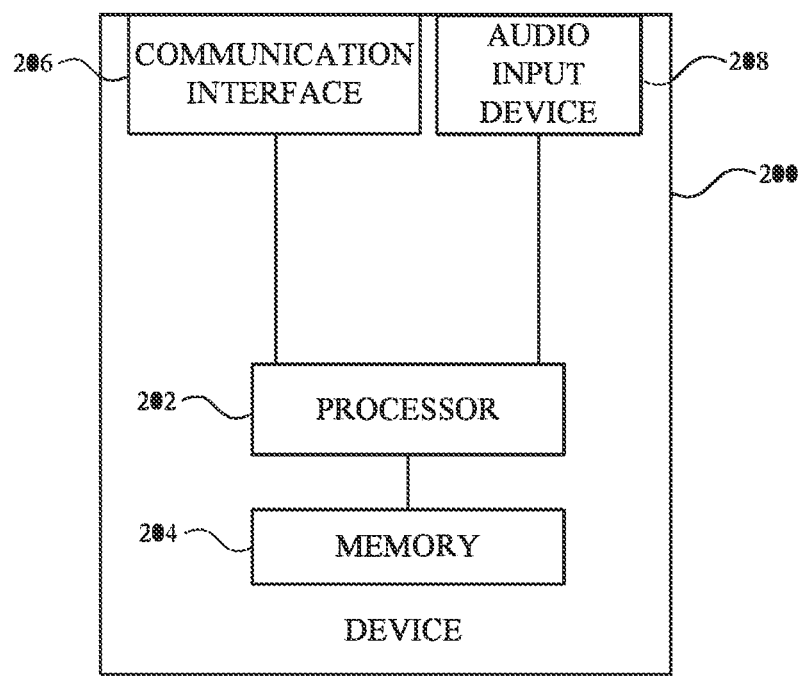
FIG. 2 illustrates an example device that may implement a system for responding to a user request in a connected home environment in accordance with one or more implementations.

FIG. 2 illustrates an example device that may implement a system for responding to a user request in a connected home environment in accordance with one or more implementations. For example, the device 200 of FIG. 2 can correspond to any of the electronic devices 102-107 and/or the servers 112-114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an audio input device 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-105, the memory 204 may store one or more components configured to receive a request (e.g., a voice request), associate the request with a user account and provide for responding to the request. Moreover, the audio input device 208 may include suitable logic, circuitry, and/or code for capturing audio input, such as voice requests. For example, the audio input device 208 may include one or more microphones and/or other devices for capturing audio input.

In one or more implementations, in a case where the device 200 corresponds to the cloud-based service, 114, the memory 204 may store user profile data (e.g., voice profiles) and/or configuration settings associated with a home environment (e.g., the connected home environment 116).

The communication interface 206 may include suitable logic, circuitry, and/or code that enables wired or wireless communication, such as between any of the electronic devices 102-107 and/or the servers 112-114 over the network 110 (e.g., in conjunction with the LAN 108). The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the audio input device 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
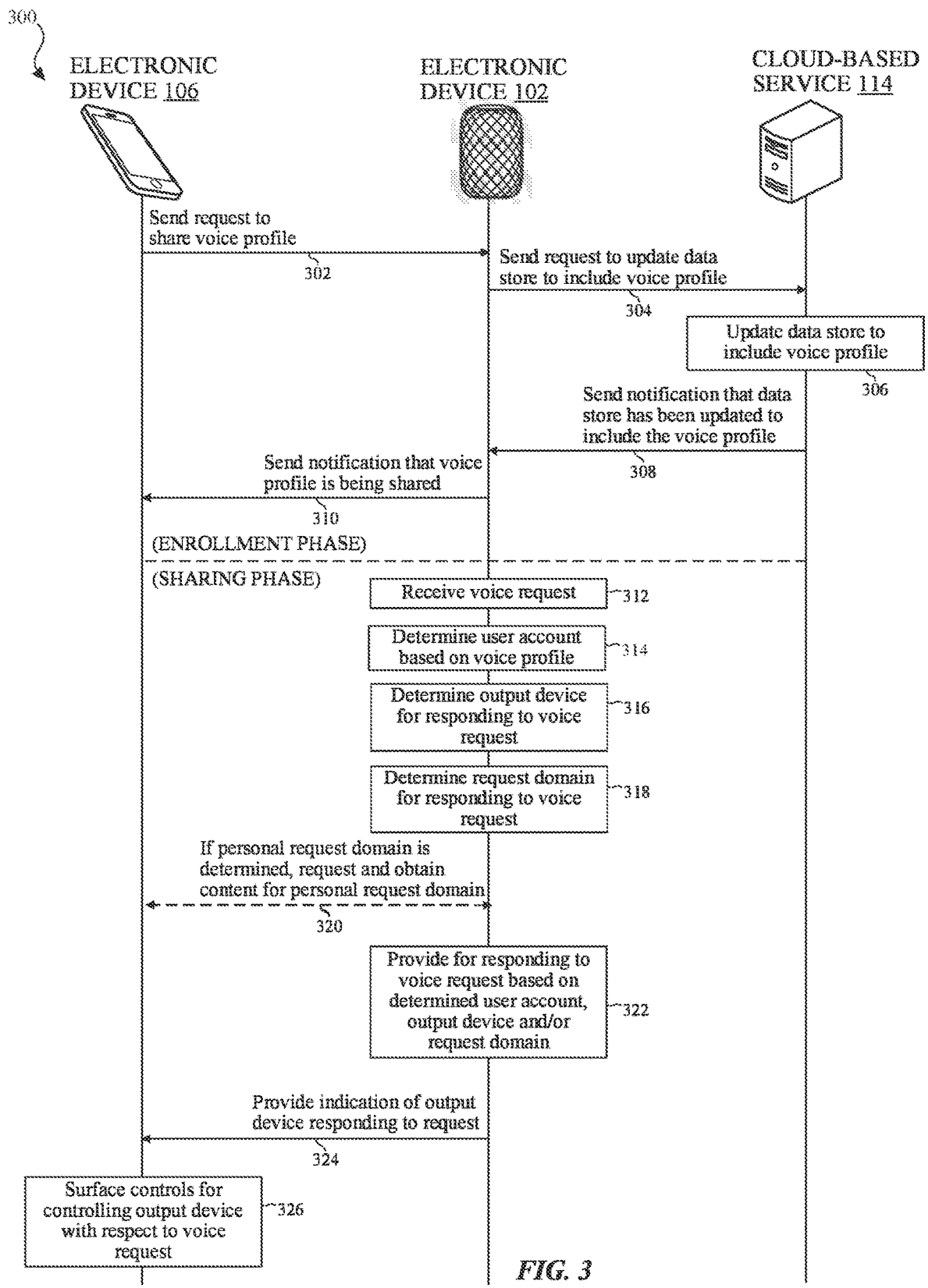
FIG. 3 illustrates an example process for utilizing a voice profile in a connected home environment in accordance with one or more implementations.

FIG. 3 illustrates an example process for utilizing a voice profile in a connected home environment in accordance with one or more implementations. For explanatory purposes, the process 300 is primarily described herein with reference to the electronic devices 102 and 106, and the cloud-based service 114 of FIG. 1. However, the process 300 is not limited to the electronic devices 102 and 106, and the cloud-based service 114 of FIG. 1, and one or more blocks (or operations) of the process 300 may be performed by one or more other components and/or other suitable devices (e.g., any of the electronic devices 102-107). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As noted above, the connected home environment 116 of FIG. 1 may include electronic devices associated with respective user accounts (e.g., the electronic device 106 being associated with Alison's user account and the electronic device 107 being associated with Bob's user account). Moreover, the connected home environment 116 may include one or more of the electronic devices 102-105, corresponding to multi-user devices that are configured to output content and/or respond to requests with respect to different user accounts. In one or more implementations, the electronic devices 102-105 may belong to Bob, and therefore Bob's user account may be associated with the electronic devices 102-105 as the owner user account and/or as the primary user account.

The process 300 includes an enrollment phase (e.g., blocks 302-310) and a sharing phase (e.g., blocks 312-326). During the enrollment phase, a user of the electronic device 106, such as Alison, may request to share a voice profile with the electronic device 102, and appropriate updates may be made to a cloud-based data store to share the voice profile. Moreover, during the sharing phase, the user of the electronic device 106 may use the voice profile in association with issuing voice requests to the electronic device 102. In one or more implementations, the enrollment phase may first occur when the user associated with the electronic device 106, e.g., Alison, is invited to the connected home environment 116 by the electronic device 107 associated with the user account of the owner of the connected home environment 116, such as Bob. Alison may accept Bob's request, e.g. via the electronic device 106, and Alison may then complete the enrollment phase.

As described herein, in one or more implementations, different identifiers may be used to identify user accounts and/or devices associated with the connected home environment 116. For example, after Alison completes the enrollment process with respect to Bob's connected home environment 116, Alison may be identifiable by one or more of: a "home user identifier" that uniquely identifies Alison with respect to the home account (e.g., for the connected home environment 116); a "shared user identifier" that uniquely identifies Alison across multiple devices associated with Alison's user account (e.g., the electronic device 106 as well as other devices associated with Alison's user account); a "primary device identifier" that identifies the electronic device 106 as a primary device of Alison; and/or a "content user identifier" that uniquely identifies Alison with respect to the content provider 112. Similar identifiers may be associated with Bob and other user accounts associated with the connected home environment 116.

At operation 302, the electronic device 106, e.g. associated with Alison's user account, sends, to the electronic device 102, e.g., associated with Bob's user account, a request to share a voice profile with the electronic device 102. For example, the request may be sent based on user input received via a user interface displayed at the electronic device 106. The user interface may provide the user (e.g., Alison) with the option to share a voice profile, which is associated with the electronic device 106, with the electronic device 102. By sharing the voice profile, the electronic device 102 may access Alison's voice profile when responding to a voice request received by the electronic device 102 (e.g., to detect whether the voice request is attributable to Alison).

In one or more implementations, Alison may already have a voice profile stored in association with the electronic device 106 (e.g., her personal device). As discussed below with respect to FIG. 4, the voice profile may be stored in an encrypted data store (e.g., within the cloud-based service 114) in association with the electronic device 106. However, it is possible that Alison may have not yet set up a voice profile in association with the electronic device 106. In such a case, the user interface for sharing a voice profile (e.g., as displayed at the electronic device 106) may provide an option for Alison to set up a voice profile. In one or more implementations, setting up a voice profile may request Alison to provide voice input to the electronic device 106 based on a series of predefined questions. For example, the predefined questions may assist in determining vocal characteristics (e.g., tone, pitch, accent and the like) for Alison's voice. After completing the voice profile setup, an encrypted data store may be updated for Alison, to include a voice profile associated with Alison's user account for the electronic device 106.

At operation 304, the electronic device 102 sends, to the cloud-based service 114, a request to update a data store on the cloud-based service 114 to include the voice profile. As noted, the data store may correspond to a secure/encrypted data container for storing a respective voice profile for Alison. The cloud-based service 114 may include additional encrypted data stores for including voice profiles associated with other user accounts (e.g., a voice profile for Bob and/or voice profiles for other user accounts associated with the connected home environment 116). In one or more implementations, the cloud-based service 114 may be configured to identify users based on the shared user identifiers as described above. As such, the request at operation 304 may include the shared user identifier for Alison. The request may further include the primary device identifier for the electronic device 106 (e.g., corresponding to Alison's personal device).

Figure 4:
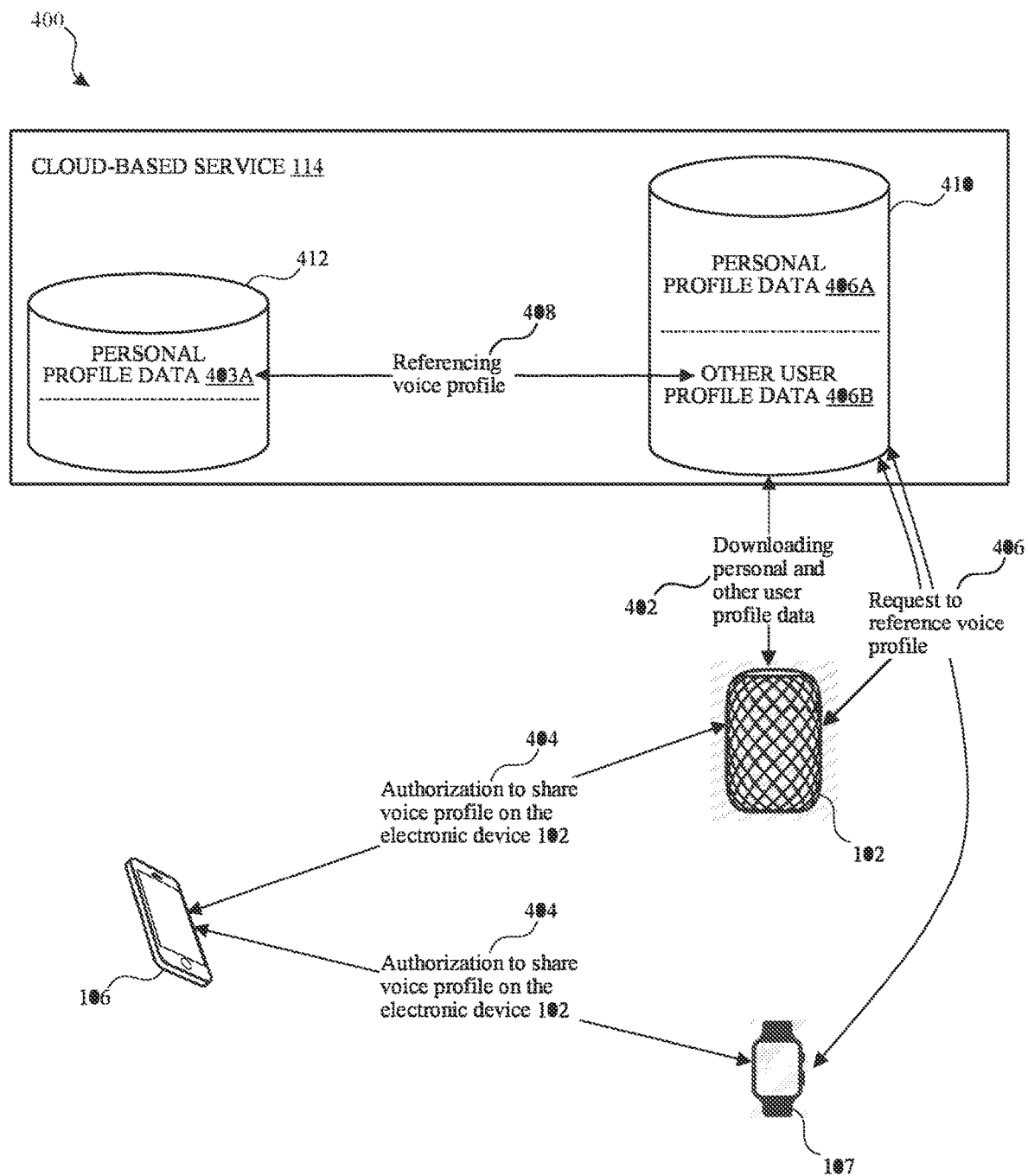
FIG. 4 illustrates an example process of sharing user profile data contained within data stores with a multi-user device in accordance with one or more implementations.

The cloud-based-server service 114 receives the request and shares Alison's voice profile with Bob's device (e.g., the electronic device 102) by performing, for example, the following process described with respect to FIG. 4. In this regard, FIG. 4 illustrates an example process of sharing profile data contained within data stores with a multi-user device in accordance with one or more implementations. For explanatory purposes, the process 400 is primarily described herein with reference to the electronic devices 102, 106 and 107 and the cloud-based service 114 of FIG. 1. However, the process 400 is not limited to the electronic device 102, 106 and 107 and/or the cloud-based service 114, and one or more other components and/or other suitable devices (e.g., any of the electronic devices 102-107) may be used.

As noted above with respect to FIG. 1, the electronic device 106 may be associated with/registered to Alison's user account and may correspond to a personal device of Alison, the electronic device 107 may be associated with/registered to Bob's user account and may correspond to a personal device of Bob, and the electronic device 102 may be associated with/registered to Bob's user account and may correspond to a multi-user device associated with a home account for Bob (e.g., where the devices 102, 106 and 107 are connected to the LAN 108).

In the example of FIG. 4, the cloud-based service 114 includes data stores 410 and 412, which may correspond to encrypted data containers specific to individual user accounts. For example, the data store 412 includes a voice profile for the user account of Alison (e.g., stored as personal profile data 403A), and the data store 410 includes a voice profile for the user account of Bob (e.g., stored as personal profile data 403A). Moreover, the data store 410 may include one or more references to other users' voice profiles/profile data (e.g., stored as other user profile data 406B). Thus, the data store 410 may be logically partitioned into separate zones, where a first zone stores the profile data 406A corresponding to Bob's user account, and a second zone stores references for other users' profile data 406B. Although not shown in FIG. 4, the data store 412 may include a respective zone for other user profile data (e.g., based on multi-user devices in a separate home in which Alison is the owner of the home account). As shown in operation 402, the electronic device 102 may access the data store 410, so as to download the personal profile data 406A and/or the other user profile data 406B from the data store 410.

In one or more implementations, each of the voice profiles corresponding to the personal profile data 403A, the personal profile data 406A and/or the other user profile data 406B may store the above-noted home user identifier, shared user identifier, primary device identifier, and content user identifier for the respective user(s) accounts. Moreover, the personal profile data 403A, the personal profile data 406A and/or the other user profile data 406B may store a mapping between the various identifiers, in order for the electronic devices 102-105 to identify users with respect to the cloud-based service 114, the content provider 112 and/or the connected home environment 116. The mapping may be encrypted, such that authorized devices (e.g., the electronic devices 102-105) may access the mapped identifiers to properly identify user accounts and/or devices, while other services (e.g., corresponding to the cloud-based service 114) are not able to access the mapping as encrypted.

In one or more implementations, one or more of the personal profile data 403A and/or the personal profile data 406A may correspond to data that was copied (e.g., mirrored) from other data store(s) (not shown). The other data store(s) may correspond to legacy data store(s) configured to store voice profiles for individual users, without necessarily being configured to store data corresponding to other users' profiles (e.g., such that the legacy data stores included the above-mentioned first zone but not the second zone). Thus, with respect to incorporating voice profile data stored on the legacy data stores onto the data stores 410-412, the cloud-based service 114 may provide for mirroring the data from the legacy data stores into the respective personal profile data 406A and personal profile data 403A zones of the data stores 410-412.

As noted above, Alison's electronic device 106 may display a user interface for Alison to share her voice profile with the electronic device 102. In response, Bob (e.g., who may correspond to the owner of the home account) may be provided with a user interface for accepting that Alison's voice profile be shared for the electronic device 102 (e.g., and/or the electronic device 104). As shown in operations 404 of FIG. 4, the user interface may be provided at one or more of the electronic device 107 and/or the electronic device 102 (e.g., or 104, not shown in FIG. 4), such that Bob may authorize via either the electronic devices 102 and/or 107. In authorizing with respect to the electronic device 102, the user interface may be voice-based (e.g., "may Alison add/share her voice profile with this device?"), such that Bob may authorize via the electronic device 102 using a voice command (e.g., "yes") that is authenticated using Bob's voice profile. On the other hand, in authorizing with respect to the electronic device 107, the user interface may be display-based.

At operation 406, after Bob has authorized the sharing of Alison's voice profile on the electronic device 102, the electronic device 102 and/or the electronic device 107 (e.g., devices associated with Bob's user account) may request that the data store 410 (e.g., encrypted to Bob's user account) reference the voice profile associated with Alison's user account stored on the data store 412. In response to this request, the cloud-based service 114 at operation 408 may provide that the other user profile data 406B of the data store 410 be updated to reference the personal profile data 403A of the data store 412. With respect to above-noted operation 402, the electronic device may download the personal profile data 406A from the data store 410. Moreover, the electronic device 102 may download the other user profile data 406B, which as noted above, references the personal profile data 403A. Thus, the electronic device 102 may access (e.g., via download) the voice profile associated with Alison's user account.

As such, with reference to operation 306 of FIG. 3, Bob's data store 410 is updated to store a reference to Alison's data store 412. At operation 308, the cloud-based service 114 sends, to the electronic device 102, a notification of the update (e.g., that data store 410 references data store 412, so that the electronic device 102 may download Alison's voice profile). At operation 310, the electronic device 102 sends a notification to the electronic device 106 that the voice profile is being shared.

In one or more implementations, user configuration settings (discussed below) associated with Alison's user account may also be stored on the data store 412 (e.g., as part of the personal profile data 403A). The configuration settings may be referenced by the data store 410 (e.g., via the other user profile data 406B), and downloaded by the electronic device 102. Thus, the downloading of the Alison's voice profile data and/or configuration settings may correspond to with completion of the enrollment phase.

Regarding the sharing phase, at operation 312, the electronic device 102 receives a request (e.g., a voice request) for content, e.g., to output content. For example, the voice request may correspond to one or more types of request for content, including, but not limited to: messaging (e.g., text messages, emails), calendar content, music, photo & video, games, books, business, catalogs, education, entertainment, finance, food & drink, health & fitness, lifestyle, medical, music, navigation, news, productivity, reference, social networking, sports, travel, utilities and weather.

Operations 314-318 relate to determining appropriate user accounts, output devices and/or request domains for responding to the voice request. In one or more implementations, each user account (e.g., Alison, Bob) may have configuration settings associated therewith. The configuration settings for a user account may indicate particular authorizations that have been set by the associated user. The configuration settings may have been set at a time when the user was first invited to access multi-user devices (e.g., the electronic devices 102-105) within the home environment, and may be updatable at a later time by the user via a control application for settings associated with home accounts. Moreover, the electronic device 102 may download the configuration settings via the data store 410 (e.g., by direct download of Bob's configuration settings within the personal profile data 406A and/or based on a reference to Alison's configuration settings within the other user profile data 406B).

The configuration settings may include, but are not limited to: sharing a voice profile in association with a home account; sharing a user account profile from which content may be provided in association with a home account; specifying which of the electronic devices 102-105 are authorized to access/activate the user account profile; enabling personal requests in association with a home account; specifying which of the electronic devices 102-105 are authorized to perform personal requests. In one or more implementations, the user account profile may relate to user accounts for content (e.g., music, video, games, and the like) that may be provided by the content provider 112. Moreover, the personal requests may relate to content that is stored on a personal electronic device (e.g., the electronic devices 106-107) of a user. For example, personal requests may relate to content included in electronic messages (e.g., text messages, emails), documents, contacts and/or calendar information stored on, and/or accessible to, the personal electronic device.

At operation 314, the electronic device 102 determines a user account based on the voice profile. As noted above, the data store 410 may store personal voice profiles (e.g., within personal profile data 406A) and/or may reference other users' voice profiles (e.g., within other user profile data 406B). The electronic device 102 may have downloaded these voice profiles (e.g., as part of a bootstrap process).

For each voice profile, the electronic device 102 may calculate a confidence score that the user (e.g., associated a user account) who issued/spoke the voice request corresponds to the voice profile for the user account. The confidence scores may be based on comparing vocal characteristics (e.g., tone, voice pitch, accent and the like) associated with the voice request with corresponding vocal characteristics associated with the respective voice profiles. The electronic device 102 may determine a user account based on the calculated confidence scores.

In one or more implementations, electronic device 102 determine the user account based on the confidence scores and/or additional data with respect to user accounts. For example, the additional data may include prior user feedback, viewing history, listening history, viewing/listening patterns, and the like. In one or more implementations, the electronic device 102 may interact with the cloud-based service 114 in determining the user account based on the voice profile.

At operation 316, the electronic device 102 determines an output device (e.g., one of the electronic devices 102-105) for responding to the voice request. For example, the voice request received at the electronic device 102 may be a request to output content (e.g., video content). The electronic device 102 may determine, based on the voice request, to provide the content via one of the electronic devices 104-105. For example, the voice request may have explicitly indicated to output content "on a TV," and the electronic device 102 may determine (e.g., based on configuration settings) that the electronic devices 104-105 are the only multi-user devices within the connected home environment 116 that correspond to a TV. Alternatively or in addition, the voice request may have requested to output video content (e.g., by including a movie, show or other video-based title in the request), such that output to a TV is implicit. In response, the electronic device 102 may determine to provide the content via one of the electronic devices 104-105, since the electronic device 102 does not include the appropriate hardware for video output.

Alternatively or in addition, determination of the output device may be further based on other configuration settings associated with the home environment (e.g., and stored by the cloud-based service 114). For example, the configuration settings may indicate which rooms (e.g., living room, kitchen) and/or floors (e.g., upstairs, downstairs) each of the electronic devices 102-105 is located in. If the user does not specify a specific output device, since the user is presumably in the same room as the electronic device 102, the electronic device 102 may select an output device which is located in the same room and/or floor as itself (e.g., the electronic 103 is on the same floor as the electronic device 102, as shown in FIG. 1). In addition, the determination of the output device may be based on the availability of the content (e.g., a movie or show title) on the output device relative to other output devices in the connected home environment 116. For example, availability may be based on one or more of the user profile accounts associated/selectable on the output device (e.g., based on the configuration settings) and/or may be vendor-based (e.g., where applications installed on the respective output device are associated with vendors that have different content availability). In one or more implementations, the electronic device 102 may interact with the cloud-based service 114 in determining the output device.

At operation 318, the electronic device 102 determines a request domain for responding to the voice request. In one or more implementations, different request domains may correspond with different personal data (e.g., privacy levels) for responding to a request. The different request domains may include, but are not limited to a personal request domain, a media request domain and/or a general request domain. The determination of a request domain may be based on the content being requested with respect to the voice request, configuration settings (e.g., user authorizations) associated with the connected home environment 116, and/or confidence scores with respect for voice requests corresponding to voice profiles.

The personal request domain may correspond to a privacy level for accessing content on a personal device (e.g., the electronic device 106). For example, the content may correspond to electronic messages (e.g., text messages, emails), documents, address book data (e.g., contacts, addresses), calendar information and/or other personal data stored on the personal electronic device 106. The voice request may be for the electronic device 102 to output (e.g., via audio playback) content included in such personal data (e.g., a voice request of "read me my last text message"). As noted above, the configuration settings may include authorizations, provided by the user, with respect to personal requests, and which of the electronic devices 102-105 are authorized to access data from the personal request domain.

The media request domain may correspond to a privacy level for accessing media content (e.g., music, video, games and the like) associated with a user account. For example, media content may be provided by the content provider 112 in association with user account profiles. Examples of a voice request corresponding to the media request domain include requests to play music, video and/or games. As noted above, the configuration settings may include authorizations, provided by the user, with respect to user account profiles, and which of the electronic devices 102-105 are authorized to access/activate user account profiles.

The general request domain may correspond to a privacy level for accessing general content. Examples of a voice request corresponding to the general request domain include requests for the weather, time of day and/or other general information. In one or more implementations, the general request domain is independent of the user account. Alternatively, the general request domain may be associated with user preferences (e.g., stored in association with a user account) for the output of general content based on user preferences (e.g., units of measure such as Celsius vs. Fahrenheit for weather, metric vs. standard, 12 vs. 24 hour for time).

The determination of the appropriate request domain may further be based on a confidence score in determining the user who issued the voice request, for example, as described above with respect to operation 314. The determination may be further based on the additional data (e.g., stored locally by the electronic device 102 and/or as stored by the cloud-based service 114) with respect to user accounts, including prior user feedback, viewing history, listening history, viewing/listening patterns, and the like. In one or more implementations, the electronic device 102 may interact with the cloud-based service 114 in determining the request domain.

Operation 320 is illustrated as optional, based on determining (at operation 318) that the request domain corresponds to the personal request domain. In such a case, the electronic device 102 communicates with the electronic device 106 in order to access the content (e.g., a message, document, calendar, address book or other personal data stored) from the electronic device 106 corresponding to the voice request. The accessed content may be output by the electronic device 102 (e.g., audio output of a text message) and/or another determined output device.

At operation 322, the electronic device 102 provides for responding to the voice request based on one or more of the determined user account (corresponding to operation 314), the determined output device (corresponding to operation 316) and/or the determined request domain (corresponding to operation 318 and/or optional operation 320).

With respect to the various determinations, it is possible that a user account different from the determined user account (at operation 314, corresponding to who issued the voice request) may be used to output the content corresponding to the voice request. The electronic device 102 may be configured to check whether the requested content (e.g., corresponding to the voice request) is available on different user accounts.

For example, both Alison and Bob may have user account profiles that are authorized for video output on the electronic device 103. With respect to a requested movie, music, game or the like, the content may be unavailable within Alison's content library (e.g., corresponding to the content provider 112), but may be available within Bob's content library. Thus, even if the electronic device 102 in conjunction with the cloud-based service 114 initially determined that the Alison issued the voice request, the output of content may be switched to a different user account. In a case where the requested content is also unavailable on Bob's user account, the electronic device 102 may select among other user account profile(s) on the output device (e.g., within the connected home environment 116), including a default account that may be associated with the home but not necessarily associated with a specific user within the home.

At operation 324, the electronic device 102 sends, to the electronic device 106 (e.g., based on the primary device identifier associated with the identified user account), an indication of the output device responding to the request. At operation 326, the electronic device 106 surfaces user interface controls for controlling the output device with respect to the voice request. For example, if the electronic device 102 corresponds to the output device (e.g., for playing music), the electronic 106 may surface a set of controls on the electronic device 106 for remotely controlling the output of music (e.g., pause, play, switch song, switch playlist and/or switch user account from Alison to Bob). In another example, if the electronic device 104 corresponds to the output device (e.g., for playing a video), the electronic 106 may surface a set of controls for remotely controlling the output of the video (e.g., pause, play, switch movie, switch user account from Alison to Bob). In yet another example, if the electronic device 104 corresponds to the output device (e.g., for playing a game), the electronic 106 may surface a set of controls for playing the game and/or otherwise interacting with the game (e.g., pause, play, account settings, save current place in game, and the like).

In one or more implementations, a playback history and/or preferences for the user account (e.g., Alison) may be updated based on the output of content. For example, the cloud-based service 114 may store history and/or preference data to indicate one or more of the output device, the output content and/or the user account used for output. Such history data may be used to provide recommendations and/or facilitate future playback of content with respect to a user account.

In one or more implementations, the voice profile data for the user who issued the voice request (e.g., Alison) may be updated, for example, based on one or more of playback history and/or user feedback (e.g., where Alison indicates that the response to the voice request is incorrect or correct). In updating the voice profile, one or more of the electronic device 102 and/or the electronic device 106 may provide for the personal profile data 403A to be updated, via the references to the voice profile included in the other user profile data 406B.

In one or more implementations, Alison may opt (e.g., via user input at the electronic device 106, or via voice command at a multi-user device) to no longer associate her user account and/or voice profile with the home account and the electronic devices 102-105. In response to the request, the corresponding identifiers and/or within the other user profile data 406B, as well as the reference to the personal profile data 403A within the other user profile data 406B, may be removed.

Figure 5:
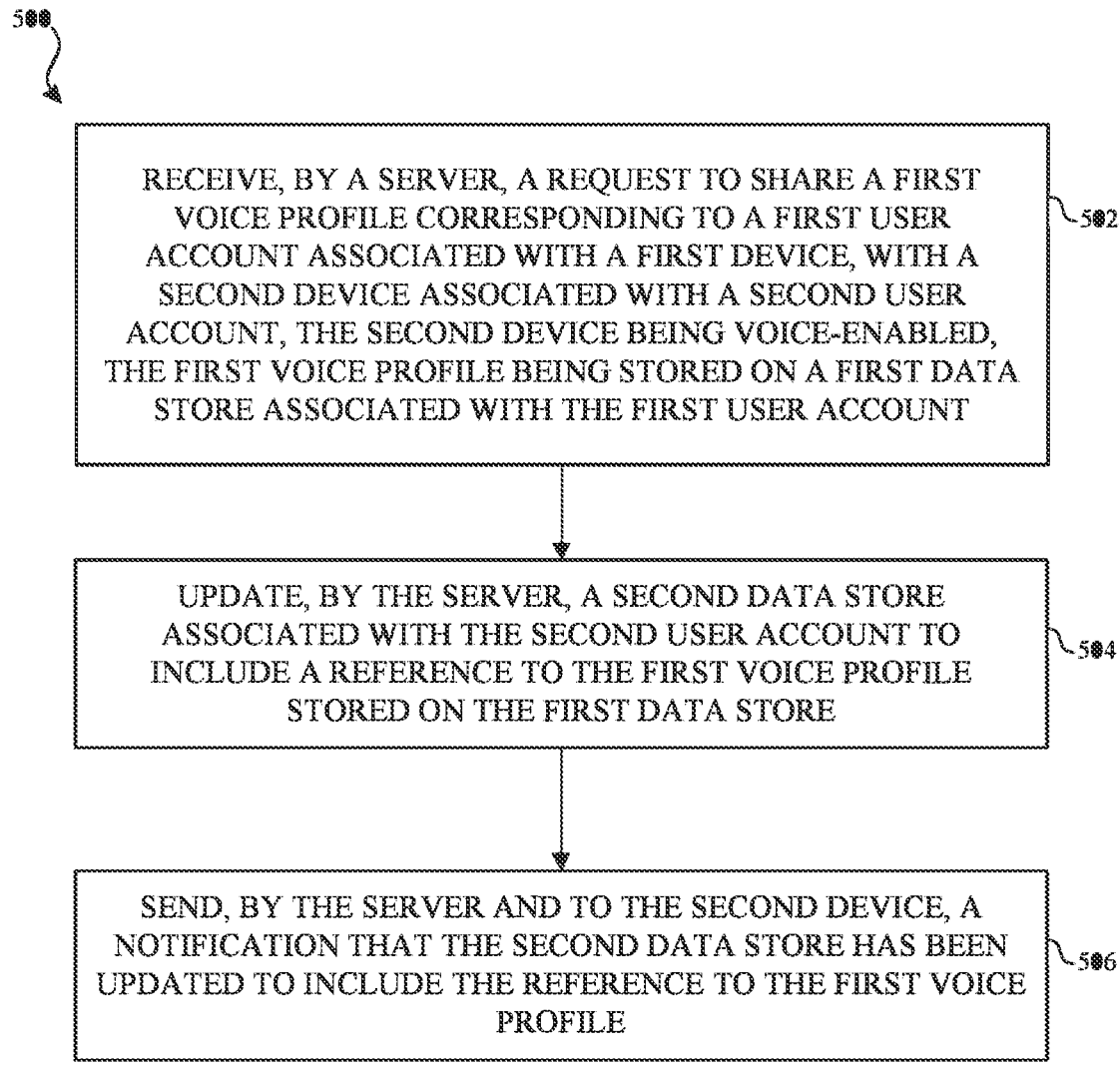
FIG. 5 illustrates a flow diagram of an example process for providing a multi-user device with access to a voice profile in accordance with one or more implementations.

FIG. 5 illustrates a flow diagram of an example process 500 for providing a multi-user device with access to a voice profile in accordance with one or more implementations. For explanatory purposes, the process 500 is primarily described herein with reference to the electronic devices 102-106 and the cloud-based service 114 of FIG. 1. However, the process 500 is not limited to the electronic devices 102-106 and the cloud-based service 114 of FIG. 1, and one or more blocks (or operations) of the process 500 may be performed by one or more other components of the cloud-based service 114 and other suitable devices (e.g., any of the electronic devices 102-107). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The cloud-based service 114 receives a request to share a first voice profile corresponding to a first user account (e.g., associated with the electronic device 106) with the electronic device 102 associated with a second user account (502). The electronic device 102 is voice-enabled, and the first voice profile is stored on a first data store associated with the first user account. Receiving the request may be based on user input received at the electronic device 106, the user input authorizing to share the first voice profile with the electronic device 102.

The electronic device 102 may be associated with a home account corresponding to the second user account. A user of the first user account may be identifiable by at least one of a first identifier that uniquely identifies the user with respect to the home account, a second identifier that uniquely identifies the user across multiple devices of the user, a third identifier that identifies the electronic device 106 as a primary device of the user, or a fourth identifier that uniquely identifies the user with respect to a media content server (e.g., the content provider 112).

The cloud-based service 114 updates a second data store associated with the second user account to include a reference to the first voice profile stored on the first data store (504). The second data store may further store a second voice profile corresponding to the second user account. The second data store may mirror the second voice profile from a third data store which does not include or reference the first voice profile.

The second data store may include a first portion and a second portion, the first portion for storing the second voice profile, and the second portion for storing the reference to the first voice profile and references to other voice profiles corresponding to user accounts other than the second user account. The cloud-based service 114 sends, to the electronic device 102, a notification that the second data store has been updated to include the reference to the first voice profile (506).

The electronic device 102 may receive a voice request from a user, and compare vocal characteristics of the voice request with those indicated by the first voice profile and the second voice (e.g., as downloaded by the electronic device via the second data store). The electronic device 102 may calculate a first confidence score that the user corresponds to the first user account, based on the voice request and the first voice profile, and calculate a second confidence score that the user corresponds to the second user account, based on the voice request and the second voice profile.

The electronic device 102 may determine, based on the first and second confidence scores, that the voice request is associated with the first user account. The electronic device 102 may provide a response to the voice request based on content that corresponds to the first user account.

Figure 6:
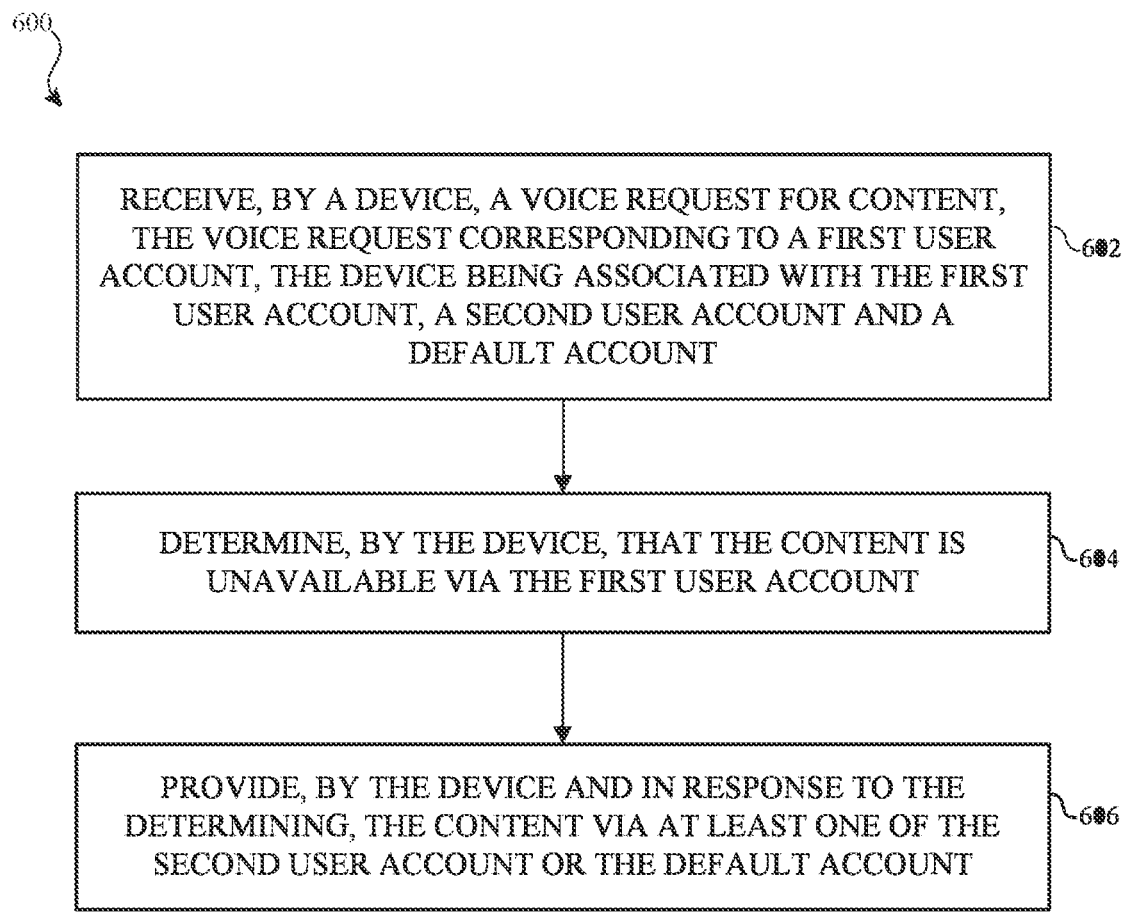
FIG. 6 illustrates a flow diagram of an example process for selecting a user account on a multi-user device from which to provide content in response to a voice request in accordance with one or more implementations.

FIG. 6 illustrates a flow diagram of an example process 600 for selecting a user account on a multi-user device from which to provide content in response to a voice request in accordance with one or more implementations. For explanatory purposes, the process 600 is primarily described herein with reference to the electronic device 102 of FIG. 1. However, the process 600 is not limited to the electronic device 102 of FIG. 1, and one or more blocks (or operations) of the process 600 may be performed by one or more other components and/or other suitable devices (e.g., any of the electronic devices 102-107). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 receives a voice request for content (602). The voice request corresponds to a first user account, and the electronic device 102 is associated with the first user account, a second user account and a default account. The electronic device 102 may determine that the voice request corresponds to the first user account based on a voice profile associated with the first user account. The second user account may correspond to an owner of the electronic device 102.

The electronic device 102 determines that the content is unavailable via the first user account (604). The determining may be based on an availability of the content within a cloud-based library of content associated with the first user account. The cloud-based library of content may include, for example, content that is owned by the first user account and/or content that is accessible to the first user account, such as through a subscription service. In one or more implementations, the content may be available to the user account through one or more different applications for which the user account directly or indirectly has access.

The electronic device 102 provides, in response to the determining, the content via at least one of the second user account or the default account (606). The electronic device 102 may provide the content via the second user account based on a determination that the content is available via the second user account. The electronic device 102 may provide the content via the default account based on a determination that the content is unavailable via the second user account. The electronic device 102 may update a playback history for the at least one of the second user account or the default account based on the providing.

Figure 7:
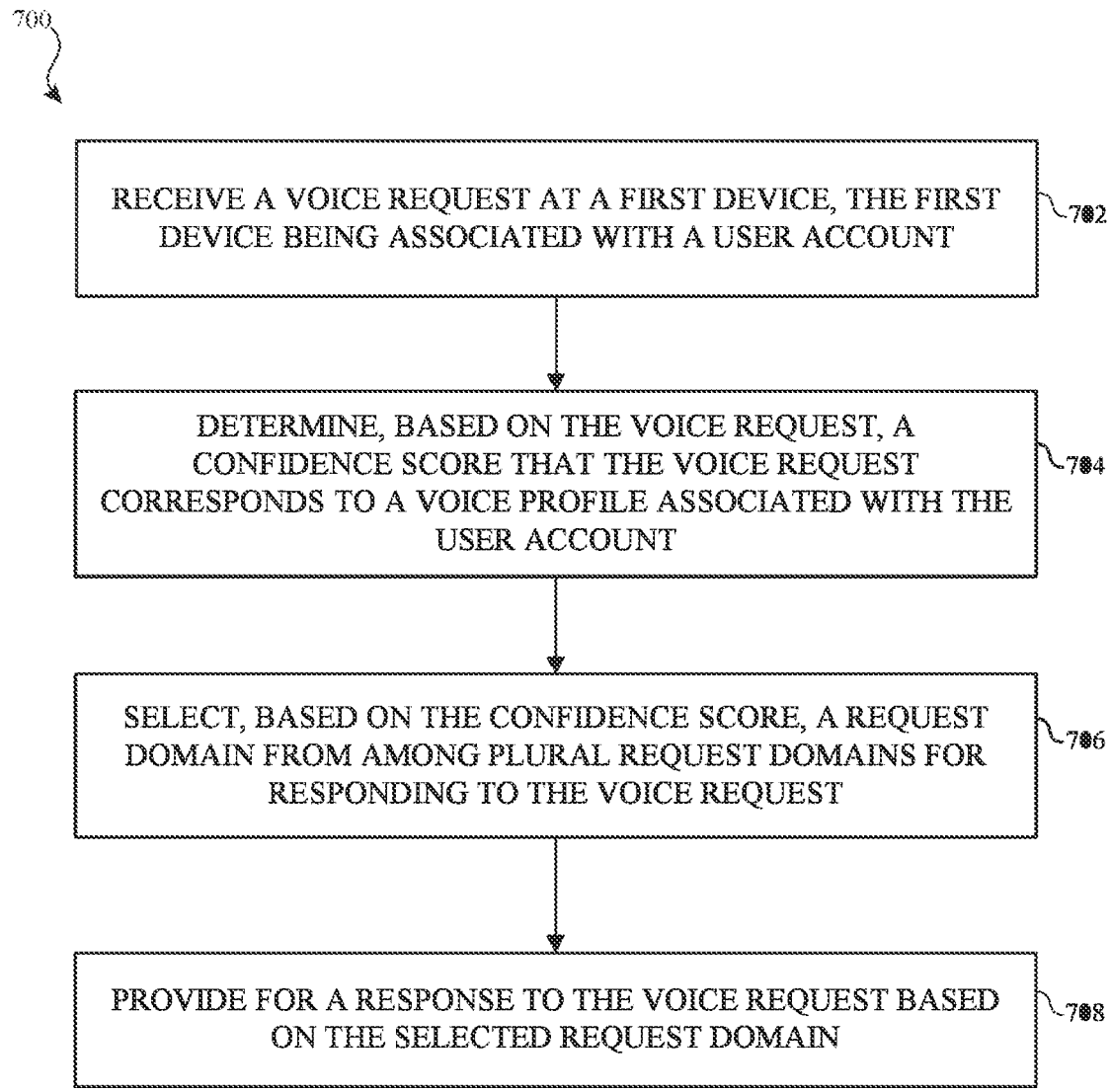
FIG. 7 illustrates a flow diagram of an example process for selecting a request domain from which to provide content on a multi-user device in response to a voice request in accordance with one or more implementations.

FIG. 7 illustrates a flow diagram of an example process 700 for selecting a request domain from which to provide content in response to a voice request in accordance with one or more implementations. For explanatory purposes, the process 700 is primarily described herein with reference to the electronic devices 102 and 106 of FIG. 1. However, the process 700 is not limited to the electronic devices 102 and 106 of FIG. 1, and one or more blocks (or operations) of the process 700 may be performed by one or more other components and/or other suitable devices (e.g., any of the electronic devices 102-107). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 receives a voice request, the electronic device 102 being associated with a user account (702). The electronic device 102 determines, based on the voice request, a confidence score that the voice request corresponds to a voice profile associated with the user account (704). The electronic device 102 may be configured to access the voice profile based on authorization received in association with the user account.

The electronic device 102 selects, based on the confidence score, a request domain from among plural request domains for responding to the voice request (706). Each request domain of the plural request domains may correspond to a respective privacy level associated with the user account. In a case where the confidence score is below a predefined value, the selecting may be further based on at least one of a location of the electronic device 102 or prior user interaction with respect to the user account.

The plural request domains may include a personal request domain corresponding to a privacy level for accessing content on a personal device (e.g., the electronic device 106) associated with the user account. Alternatively or in addition, the plural request domains may also include a media request domain corresponding to a privacy level for accessing media content associated with the user account, and/or a general request domain corresponding to a privacy level for accessing general content that is independent of the user account.

In one or more implementations, the personal request domain may be associated with the highest privacy level and therefore may require that a first, highest confidence threshold be met, the media request domain may be associated with the second highest privacy level and therefore may require, a second confidence threshold, less than the first confidence threshold to be met, and the general request domain may be associated with the lowest privacy level and therefore may require that a third confidence threshold, less than the second confidence threshold, be met.

The electronic device 102 provides for a response to the voice request based on the selected request domain (708). In a case where the selected request domain is the personal request domain, the electronic device 102 may access content from the electronic device 106, to access a message, document, calendar, address book or other personal data on the electronic device 106.

Figure 8:
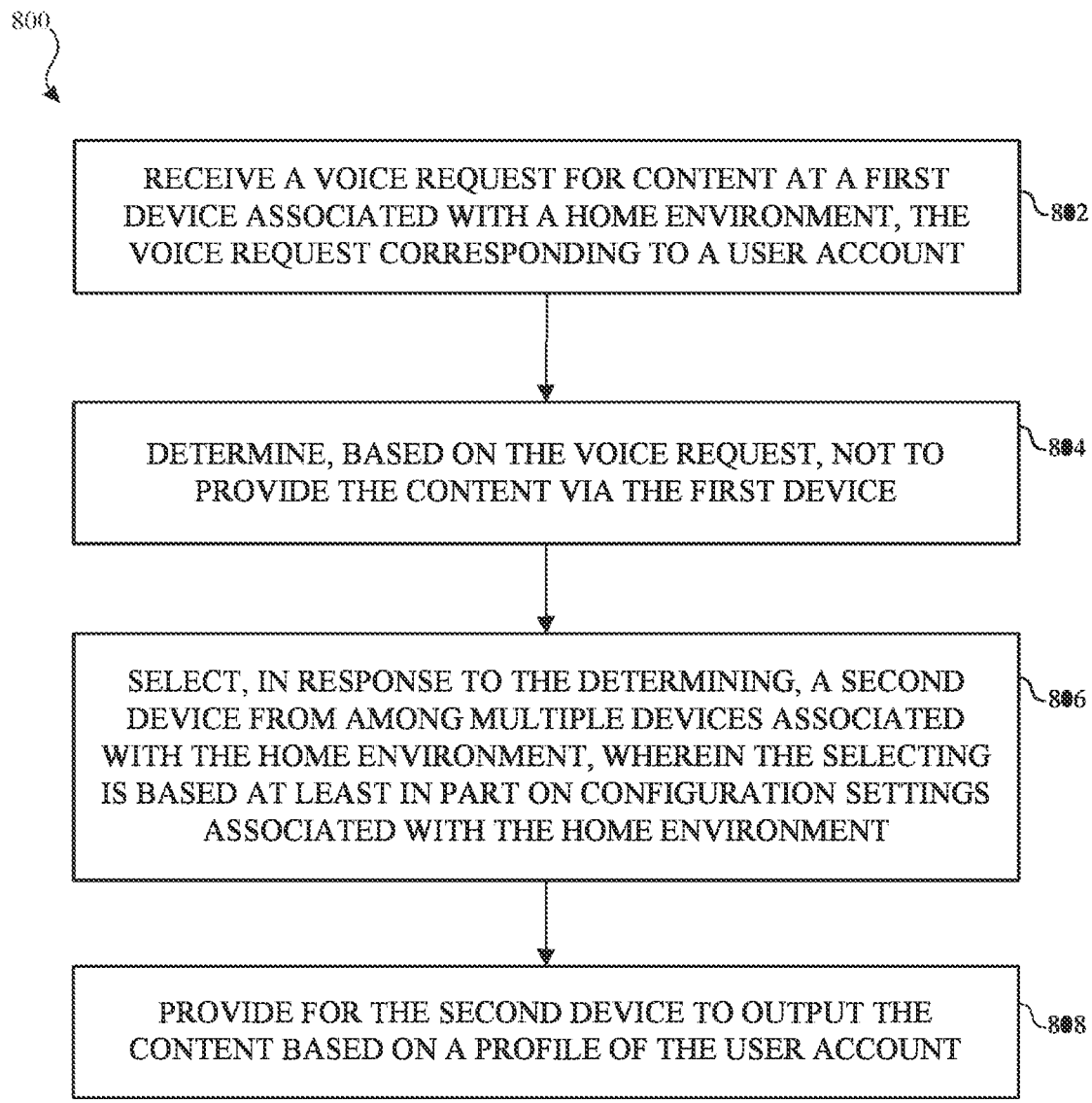
FIG. 8 illustrates a flow diagram of an example process for selecting an output device in a connected home environment from which to provide content in response to a voice request in accordance with one or more implementations.

FIG. 8 illustrates a flow diagram of an example process 800 for selecting a device from which to provide content in response to a voice request in accordance with one or more implementations. For explanatory purposes, the process 800 is primarily described herein with reference to the electronic devices 102-106 of FIG. 1. However, the process 800 is not limited to the electronic devices 102-106 of FIG. 1, and one or more blocks (or operations) of the process 800 may be performed by one or more other components and/or other suitable devices (e.g., any of the electronic devices 102-108). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The electronic device 102 receives a voice request for content (802), the electronic device 102 being associated with a home environment. The voice request corresponds to a user account. The electronic device 102 may determine that the voice request corresponds to the user account based on a voice profile associated with the user account.

The electronic device 102 determines, based on the voice request, not to output the requested content via the electronic device 102 (804). The determining may be based on the voice request implicitly or explicitly indicating to provide the content via a device other than the electronic device 102. Alternatively or in addition, the determining may be based on the electronic device 102 not including, and/or being associated with hardware needed to output the content, such as a video output device.

The electronic device 102 selects, in response to the determining, the electronic device 106 to output the content from multiple candidate output devices (e.g., that include the necessary output hardware) in the connected home environment 116 (806). In one or more implementations, the selecting is based at least in part on configuration settings associated with the connected home environment 116.

For example, the selecting may be based at least in part on the configuration settings indicating the electronic device 102 and the electronic device 106 are within a same room of the home environment. Alternatively or in addition, the selecting may be based at least in part on the configuration settings indicating that the profile of the user account is associated with the electronic device 106, and, e.g., is not associated with the other candidate output devices in the connected home environment 116. Alternatively or in addition, the selecting may be based at least in part on the configuration settings indicating that the content is available on the electronic device 106 but not on the other candidate output devices in the connected home environment 116.

The electronic device 102 provides for the electronic device 106 to output the content based on a profile of the user account (808). Prior to the providing, the electronic device 106 may activate the profile of the user account. A playback history for the user account may be updated based on the activating and the providing.

For example, the electronic device 102 may transmit a command to the electronic device 106 to switch to a particular user account profile (if necessary), such as the user account profile corresponding to the determined user account, and to begin playback of the requested content. In one or more implementations, the electronic device 102 may also transmit a command to a personal device associated with the determined user account to surface a remote control application on the electronic device 102 for remotely controlling the content being output by the electronic device 106.

As described above, one aspect of the present technology is the gathering and use of data available from specific and legitimate sources for responding to a user request within a home environment. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for responding to a user request within a home environment. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of responding to a user request using a multi-user device within a home environment, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
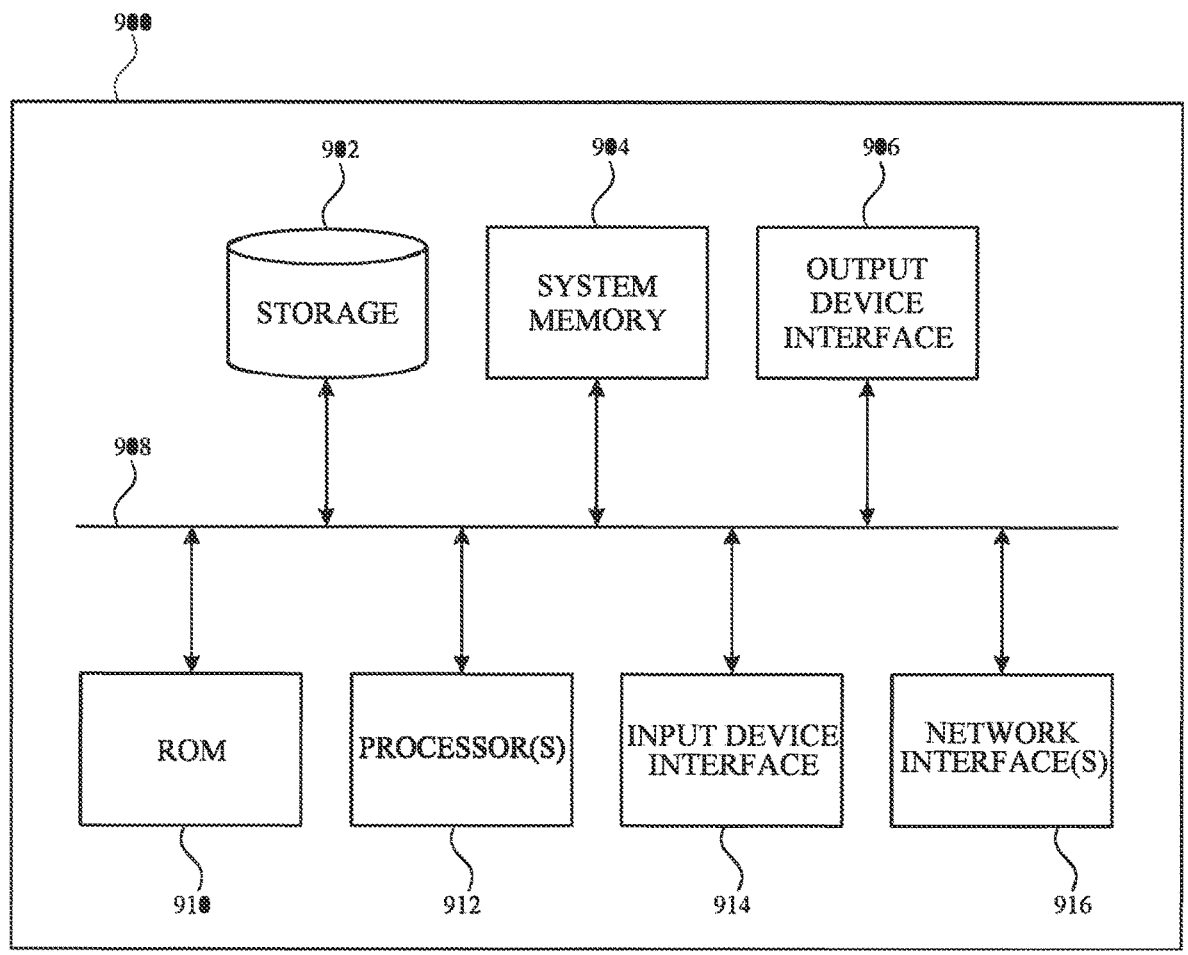
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic devices 102-107, the content provider 112 and/or the cloud-based service 114 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the content provider 112 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by one or more servers and from a first device, a request to share a first voice profile corresponding to a first user account associated with the first device, with a second device associated with a second user account, the second device being voice-enabled, the first voice profile being stored on a first data store at the one or more servers, the first data store being associated with the first user account;
   responsive to receiving, by the one or more servers, the request from the first device, updating, by the one or more servers, a second data store at the one or more servers to include, in a first secure container associated with the second user account, a reference to the first data store that stores the first voice profile, the second data store further including a second secure container associated with the second user account, the second secure container storing a second voice profile corresponding to the second user account; and
   sending, by the one or more servers and to the second device, a notification that the second data store at the one or more servers has been updated to include the reference to the first data store that stores the first voice profile.

2. The method of claim 1, further comprising:
   receiving, by the one or more servers and from the second device, a request for the first voice profile;
   obtaining, by the one or more servers, the first voice profile from the first data store via the reference stored in the first secure container associated with the second user account; and
   providing, by the one or more servers, the first voice profile to the second device.

3. The method of claim 1, wherein receiving the request is based on user input received at the first device, the user input authorizing the one or more servers to share the first voice profile with the second device.

4. The method of claim 1, wherein the second data store mirrors the second voice profile from a third data store which does not include or reference the first voice profile.

5. The method of claim 1, wherein the first data store comprises a first secure container and a second secure container, the first secure container for storing the first voice profile, and the second secure container for storing other voice profiles corresponding to user accounts other than the first user account, wherein the reference to the first data store references the first secure container of the first data store.

6. The method of claim 1, further comprising:
   downloading, by the second device and via the second data store, the first voice profile and the second voice profile;
   receiving, by the second device, a voice request from a user;
   calculating, by the second device, a first confidence score that the user corresponds to the first user account, based on the voice request and the first voice profile; and
   calculating, by the second device, a second confidence score that the user corresponds to the second user account, based on the voice request and the second voice profile.

7. The method of claim 6, further comprising:
   determining, by the second device and based on the first and second confidence scores, that the voice request is associated with the first user account; and providing, by the second device and based on the determining, a response to the voice request based on content that corresponds to the first user account.

8. The method of claim 1, wherein the second device is associated with a home account corresponding to the second user account, and
wherein a user of the first user account is identifiable by at least one of a first identifier that uniquely identifies the user with respect to the home account, a second identifier that uniquely identifies the user across multiple devices of the user, a third identifier that identifies the first device as a primary device of the user, or a fourth identifier that uniquely identifies the user with respect to a media content server.

9. A system, comprising:
a first data store;
a second data store;
at least one processor; and
a memory including instructions that, when executed by the at least one processor, cause the at least one processor to:
receive a request to share a first voice profile corresponding to a first user account associated with a first device, with a second device associated with a second user account, the second device being voice-enabled, the first voice profile being stored on the first data store which is associated with the first user account;
update the second data store which is associated with the second user account to include, in a first secure container associated with the second user account, a reference to the first data store that includes the first voice profile, the second data store further including a second secure container associated with the second user account, the second secure container storing a second voice profile corresponding to the second user account; and
send, to the second device, a notification that the second data store has been updated to include the reference to the first data store that includes the first voice profile.

10. The system of claim 9, wherein the at least one processor is further configured to:
receive, from the second device, a request for the first voice profile;
obtain the first voice profile from the first data store via the reference stored in the first secure container associated with the second user account; and
provide the first voice profile to the second device.

11. The system of claim 9, wherein the request is received based on user input received at the first device, the user input authorizing to share the first voice profile with the second device.

12. The system of claim 9, wherein the first secure container is for storing references to other data stores that include other voice profiles corresponding to user accounts other than the second user account.

13. The system of claim 9, wherein the second device is configured to:
download the first voice profile and the second voice profile via the second data store;
receive a voice request from a user;
calculate a first confidence score that the user corresponds to the first user account, based on the voice request and the first voice profile; and
calculate a second confidence score that the user corresponds to the second user account, based on the voice request and the second voice profile.

14. The system of claim 13, wherein the second device is associated with a home account corresponding to the second user account, and
wherein a user of the first user account is identifiable by at least one of a first identifier that uniquely identifies the user with respect to the home account, a second identifier that uniquely identifies the user across multiple devices of the user, a third identifier that identifies the first device as a primary device of the user, or a fourth identifier that uniquely identifies the user with respect to a media content server.

15. A computer program product comprising code, stored in a non-transitory computer-readable storage medium, the code comprising:
code to receive, by one or more servers, a request to share a first voice profile corresponding to a first user account associated with a first device, with a second device associated with a second user account, the second device being voice-enabled, the first voice profile being stored on a first data store at the one or more servers, the first data store being associated with the first user account;
code to update, by the one or more servers, a second data store at the one or more servers to store, in a first secure container associated with the second user account, a reference to the first data store, the second data store further including a second secure container associated with the second user account, the second secure container storing a second voice profile corresponding to the second user account;
code to send, by the one or more servers and to the second device based on the received request to share, a notification that the second data store at the one or more servers has been updated to include the reference to the first voice profile;
code to receive, by the one or more servers, from the second device and responsive to the notification, a request for the first voice profile; and
code to transmit, by the one or more servers, the first voice profile from the first data store associated with the first user account to the second device via the reference to the first data store stored in the second data store at the one or more servers and responsive to the request for the first voice profile.

16. The computer program product of claim 15, wherein the request is received based on user input received at the first device, the user input authorizing to share the first voice profile with the second device.

17. The computer program product of claim 15, wherein the second data store at the one or more servers mirrors the second voice profile from a third data store at the one or more servers which does not include or reference the first voice profile, the third data store being separate from the first and second data stores.

18. The computer program product of claim 15, wherein the second data store is partitioned into the first secure container and the second secure container, and the first secure container is for storing the reference to the first voice profile and references to other voice profiles corresponding to user accounts other than the second user account.

* * * * *